United States Patent
Kumagai et al.

(10) Patent No.: US 10,743,669 B2
(45) Date of Patent: Aug. 18, 2020

(54) SEAT PAD

(71) Applicant: BRIDGESTONE CORPORATION, Tokyo (JP)

(72) Inventors: Kenji Kumagai, Tokyo (JP); Yoshiyuki Takahashi, Tokyo (JP); Toshimitsu Shinohara, Tokyo (JP); Taisuke Yonezawa, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 149 days.

(21) Appl. No.: 15/576,521

(22) PCT Filed: Apr. 19, 2016

(86) PCT No.: PCT/JP2016/062336
§ 371 (c)(1),
(2) Date: Nov. 22, 2017

(87) PCT Pub. No.: WO2016/190000
PCT Pub. Date: Dec. 1, 2016

(65) Prior Publication Data
US 2018/0146787 A1    May 31, 2018

(30) Foreign Application Priority Data

May 28, 2015 (JP) ................................. 2015-108151

(51) Int. Cl.
*A47C 7/18* (2006.01)
*A47C 27/14* (2006.01)
(Continued)

(52) U.S. Cl.
CPC ............... *A47C 7/18* (2013.01); *A47C 27/14* (2013.01); *B60N 2/70* (2013.01); *B60N 2/90* (2018.02); *B68G 5/02* (2013.01)

(58) Field of Classification Search
CPC .......... A47C 7/18; A47C 27/14; A47C 27/142
See application file for complete search history.

(56) References Cited

U.S. PATENT DOCUMENTS 3,712,673 A * 1/1973 Swenson .................. A47C 7/18
                                                              297/214
4,784,437 A * 11/1988 Shimada .................. B60N 2/70
                                                              297/452.27
(Continued)

FOREIGN PATENT DOCUMENTS

CN        102233836 A      11/2011
CN        102596635 A      7/2012
(Continued)

OTHER PUBLICATIONS

Communication dated Dec. 25, 2018, from the State Intellectual Property Office of People's Republic of China in counterpart Application No. 201680030346.3.
(Continued)

*Primary Examiner* — David R Dunn
*Assistant Examiner* — Tania Abraham
(74) *Attorney, Agent, or Firm* — Sughrue Mion, PLLC (57) ABSTRACT

A seat pad (10) of the present invention includes a placement surface (11). A lateral slit portion (15) which extends from an outer side of the seat pad (10) toward an inner side thereof is formed in a first lateral direction (B1) along the placement surface (11), and at least a portion of the lateral slit portion (15) gradually becomes larger from the outer side of the seat pad (10) toward the inner side thereof in a thickness direction (H) orthogonal to the placement surface (11) along the first lateral direction (B1).

12 Claims, 5 Drawing Sheets

(51) Int. Cl.
  *B60N 2/90* (2018.01)
  *B60N 2/70* (2006.01)
  *B68G 5/02* (2006.01)

(56) References Cited

U.S. PATENT DOCUMENTS

| | | | | |
|---|---|---|---|---|
| 5,031,261 | A | * | 7/1991 | Fenner, Sr. .......... A47C 27/146 5/736 |
| 5,211,697 | A | * | 5/1993 | Kienlein .............. A47C 27/144 297/452.42 |
| 7,946,655 | B2 | * | 5/2011 | Hsu ...................... A47O 7/746 297/452.46 |
| 2010/0102615 | A1 | | 4/2010 | Yamauchi |
| 2011/0072587 | A1 | * | 3/2011 | Cao ...................... A47C 17/70 5/655.9 |
| 2013/0249197 | A1 | | 9/2013 | Fukawatase et al. |

FOREIGN PATENT DOCUMENTS

| | | |
|---|---|---|
| EP | 1330973 A2 | 7/2003 |
| EP | 3 011 870 A1 | 4/2016 |
| JP | 8-197994 A | 8/1996 |
| JP | 11-056521 A | 3/1999 |
| JP | 2006-149466 A | 6/2006 |
| JP | 2008-1214 A | 1/2008 |
| JP | 2014-226181 A | 12/2014 |
| JP | 2015-039556 A | 3/2015 |
| WO | 2014/203890 A1 | 12/2014 |

OTHER PUBLICATIONS

International Search Report for PCT/JP2016/062336 dated Jul. 26, 2016 [PCT/ISA/210].

Communication dated Mar. 27, 2018 from the European Patent Office in counterpart European application No. 16799708.9.

* cited by examiner

SEAT PAD

CROSS REFERENCE TO RELATED APPLICATIONS

This application is a National Stage of International Application No. PCT/JP2016/062336, filed on Apr. 19, 2016, which claims priority from Japanese Patent Application No. 2015-108151, filed on May 28, 2015, the contents of all of which are incorporated herein by reference in their entirety.

TECHNICAL FIELD

The present invention relates to a seat pad.

Priority is claimed on Japanese Patent Application No. 2015-108151, filed on May 28, 2015, the content of which is incorporated herein by reference.

BACKGROUND ART

In the related art, for example, a seat pad disclosed in Patent Document 1 below is known.

CITATION LIST

Patent Document

[Patent Document 1] Japanese Unexamined Patent Application, First Publication No. 2006-149466

SUMMARY OF INVENTION

Technical Problem

Meanwhile, in the seat pad of the related art, there is room for improvement in a comfortable feeling (stroke feeling) to allow the seat pad to he appropriately bent when an occupant sits on a seat such that a stable posture of the occupant is maintained.

The present invention is made in consideration of the above-described circumstances, and an object thereof is to improve the comfortable feeling.

Solution to Problem

In order to achieve the above-described object, the present invention suggests the following means.

According to an aspect of the present invention, there is provided a seat pad which includes a placement surface, in which a lateral slit portion which extends from an outer side of the seat pad toward an inner side thereof is formed in a first lateral direction along the placement surface, and at least a portion of the lateral slit portion gradually becomes larger from the outer side of the seat pad toward the inner side thereof in a thickness direction orthogonal to the placement surface along the first lateral direction.

Advantageous Effects of Invention

According to the present invention, it is possible to improve a comfortable feeling.

DESCRIPTION OF EMBODIMENTS

First Embodiment

Hereinafter, a seat pad 10 according to a first embodiment of the present invention will be described with reference to FIGS. 1 to 3.

Figure 1:
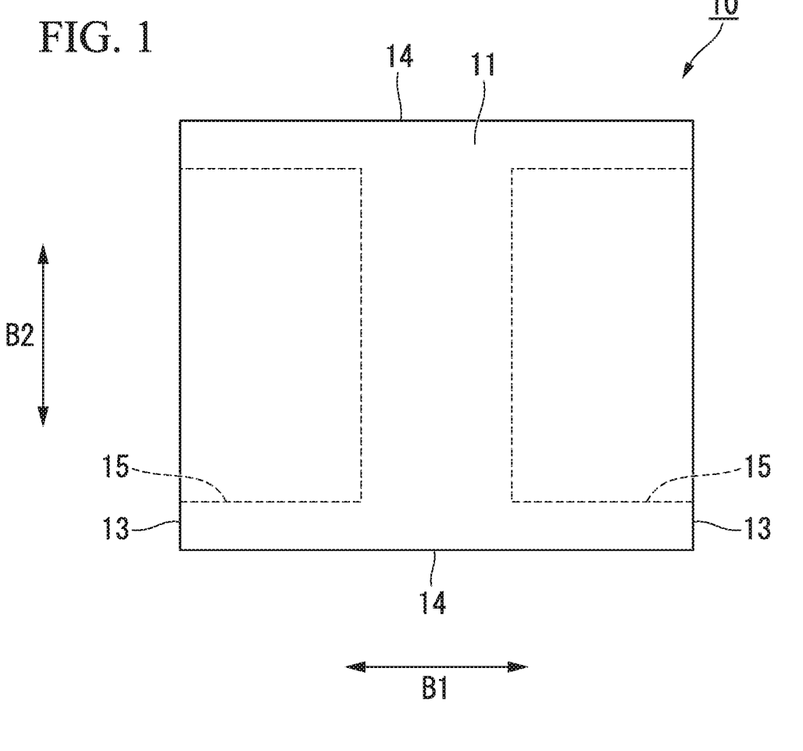
FIG. 1 is a plan view seat pad according to a first embodiment of the present invention.
Figure 2:
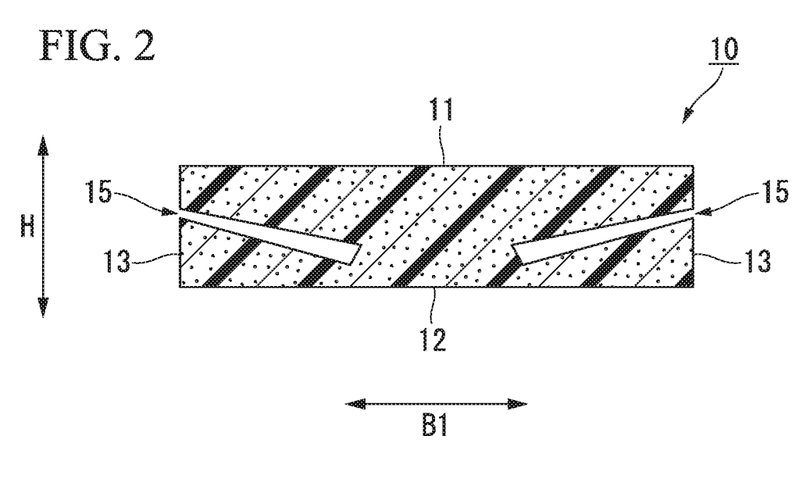
FIG. 2 is a sectional view of the seat pad shown in FIG. 1.
Figure 3:
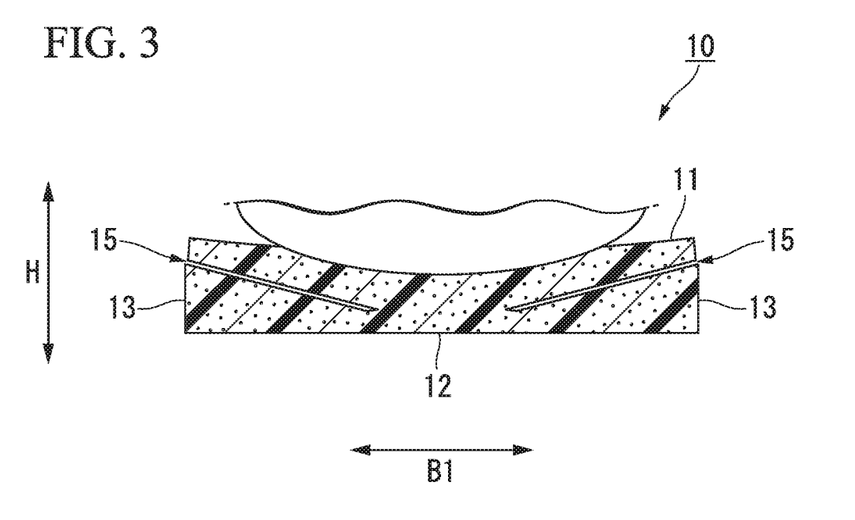
FIG. 3 is a sectional view of the seat pad shown in FIG. 1 and is a view showing a state where an occupant sits on the seat pad.

As shown in FIGS. 1 and 2, the seat pad 10 is formed of a foamed molded body.

As the foamed molded body, a soft resin foamed molded body formed by foaming a resin material, for example, soft polyurethane foam (soft resin), or the like can be mentioned. In the example shown, the seat pad 10 is integrally formed of the same material.

For example, the seat pad 10 is adopted for a seat attached to an automobile (vehicle). The seat pad 10 includes a seating surface 11 (placement surface) which contacting an occupant who sits on the seat. In the present embodiment, the seat pad 10 can be applied to a cushion pad or a back pad.

In addition, in a case where the seat pad 10 is applied to the cushion pad, in a state where the seat pad 10 is attached to an automobile, the seating surface 11 faces the upper side in a vertical direction and a load of the occupant is applied to the seat pad 10 from the upper side. In addition, in a case where the seat pad 10 is applied to the back pad, in a state where the seat pad 10 is attached to an automobile, the seating surface 11 faces the front side of the automobile and the load of the occupant is applied to the seat pad 10 from the front side.

The seat pad 10 is formed in a flat rectangular parallelepiped shape and a direction orthogonal to the seating surface 11 in the seat pad 10 is a thickness direction H of the seat pad 10. In the seat pad 10, a surface facing a side (a side opposite to the placement surface) opposite to the seating surface in the thickness direction H is an attachment surface 12 (rear surface) of the seat pad 10.

The seat pad 10 is formed in a rectangular shape which extends in a first lateral direction B1 and a second lateral direction B2 (regulation direction) orthogonal to each other along the seating surface 11 in a plan view of the at pad 10. First side surfaces 13 which extend in a direction orthogonal to the first lateral direction B1 and second side surfaces 14 which extend in a direction orthogonal to the second lateral direction B2 are provided on side surfaces of the seat pad 10. In addition, for example, the first lateral direction B1 may he right and left directions of an automobile or may be front and rear directions of a vehicle.

In the seat pad 10, lateral slit portions 15 which extend from the outer side of the seat pad 10 toward the inner side thereof along the first lateral direction B1 are formed. The lateral slit portions 15 are provided at portions positioned on both sides of the seat pad 10 in the first lateral direction B1, and are not provided at a center portion in the first lateral direction B1. Each of the lateral slit portions 15 extends from the outer side of the seat pad 10 toward the inner side thereof in a plan view of the seat pad 10.

An outer end portion of the lateral slit portion 15 in the first lateral direction B1 is open to the surface of the seat pad 10, and an inner end portion of the lateral slit portion 15 in the first lateral direction B1 is not open to the surface of the seat pad 10. Each of the lateral slit portions 15 is open to the first side surface 13 and extends from the first side surface 13 toward the inside in the first lateral direction B1.

Sizes of the lateral slit portions 15 in the first lateral direction B1 are the same as each other over the entire length in the second lateral direction B2. Each of the lateral slit portions 15 is smaller than the seat pad 10 in the second lateral direction B2 and is not open to the second side surface 14. For example, the size of the lateral slit portion 15 in the second lateral direction B2 is approximately 10 to 25 mm.

As shown in FIG. 2, the lateral slit portions 15 gradually extend toward the side opposite to the seating surface in the thickness direction H toward the inside in the first lateral direction B1. At least a portion of each of the lateral slit portions 15 gradually becomes larger in the thickness direction 11 from the outer side of the seat pad 10 toward the inner side thereof along the first lateral direction B1. In the example shown, the lateral slit portion 15 gradually becomes larger in the thickness direction 11 from the outer side of the seat pad 10 toward the inner side thereof over the entire length in the first lateral direction B1. In a sectional view when the seat pad 10 is viewed from the second lateral direction B2, the lateral slit portion 15 is formed in a triangular shape which protrudes toward the outside in the first lateral direction B1.

As described above, according to the seat pad 10 of the present embodiment, the lateral slit portions 15 which extend from the outer side of the seat pad 10 toward the inner side thereof along the first lateral direction 31 are formed in the seat pad 10. Accordingly, as shown in FIG. 3, when an occupant sits on the seating surface 11, the seat pad 10 is deformed such that the lateral slit portions 15 are narrowed in the thickness direction H. Therefore, the seat pad 10 can be appropriately bent while suppressing a hardness which an occupant feels from the seat pad 10, and thus, it is possible to improve a comfortable feeling when the occupant sits on the seat pad or when a vehicle travels around a corner.

In addition, at least a portion of each of he lateral slit portions 15 gradually becomes larger in the thickness direction H from the outer side of the seat pad 10 toward the inner side thereof along the first lateral direction B1. Accordingly, in the seating surface 11, compared to a portion positioned in the outer portion of the seat pad 10, it is possible to positively deform a portion positioned in the inner portion of the seat pad 10 to which a load is easily applied when occupant sits on the seat pad. Accordingly, for example, even when adjustment or the like of a size of the seat pad 10 in the thickness direction H is not performed, the seat pad 10 can be deformed so as to enfold the occupant on the seating surface 11 from the outside in the first lateral direction B1, and it is possible to further improve a comfortable feeling.

In addition, each of the lateral slit portions 15 gradually becomes larger in the thickness direction 11 from the outer side of the seat pad 10 toward the inner side thereof over the entire length in the first lateral direction B1. Accordingly, the degree of deformation of the seat pad 10 can be gradually changed along the first lateral direction B1, and thus, it is possible to effectively prevent discomfort from occurring when the seat pad 10 is bent.

Second Embodiment

Figure 4:
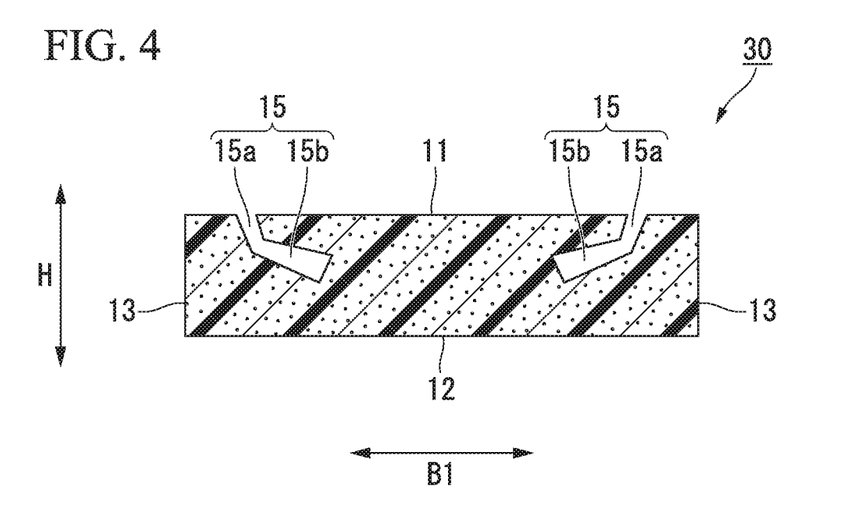
FIG. 4 is a sectional view of a seat pad according to a second embodiment of the present invention.
Figure 5:
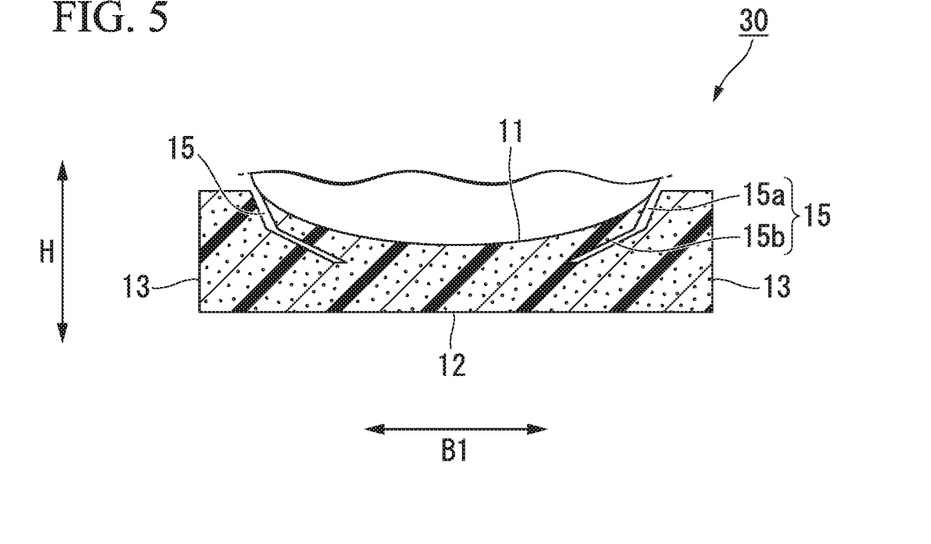
FIG. 5 is a sectional view of the seat pad shown in FIG. 4 and is a view showing a state where an occupant sits on the seat pad.

Next, a seat pad 30 of a second embodiment according to the present invention will be described with reference to FIGS. 4 and 5.

Moreover, in the second embodiment, the same reference numerals are assigned to the same components as those of the first embodiment, descriptions thereof are omitted, and matters different from each other will be mainly described.

In the seat pad 30 according to the present embodiment, in each of the lateral slit portions 15, a steep slope portion 15a positioned in the outer portion in the first lateral direction B1 and a gentle slope portion 15b positioned in the inner portion in the first lateral direction B1 are connected to each other in the first lateral direction B1. Each of the lateral slit portions 15 is open to the seating surface 11. In each of the lateral slit portion 15, an end portion, which is a portion opened to the seating surface 11 and is positioned in the outer portion of the lateral slit portion 15 in the first lateral direction B1, is positioned outside a portion of the seating surface 11, which contacting the occupant, in the first lateral direction B1. In the example shown, the portion which contacting the occupant is adjacent to the outer portion in the first lateral direction B1.

Third Embodiment

Next, a seat pad 70 of a third embodiment according the present invention will be described with reference to FIGS. 6 to 8.

Moreover, in the third embodiment, the same reference numerals are assigned to the same components as those of the first embodiment, descriptions thereof are omitted, and matters different from each other will be mainly described.

Figure 6:
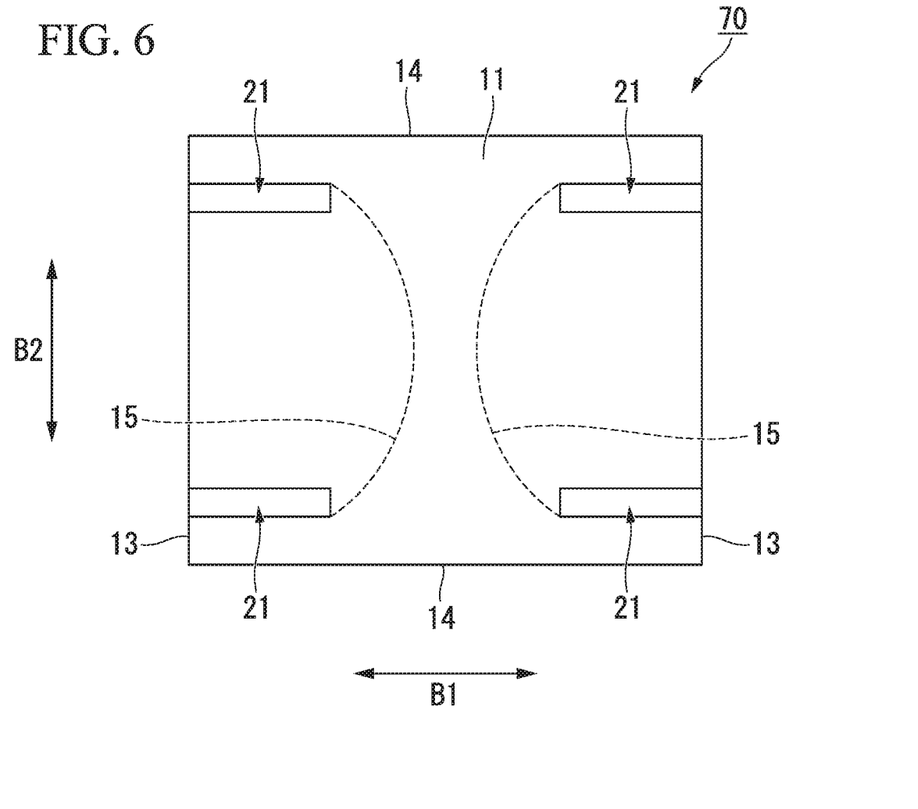
FIG. 6 is a plan view of a seat pad according to a third embodiment of the present invention.

As shown in FIG. 6, in the seat pad 70 according to the present embodiment, the lateral slit portions 15 are gradually lengthened in the first lateral direction B1 from the outer portion toward the inner portion along the second lateral direction B2. An inner end portion of each of the lateral slit portion 15 in the first lateral direction B1 is curved to protrude toward the inner side in the first lateral direction B1 in a plan view of the seat portion 70.

Figure 8:
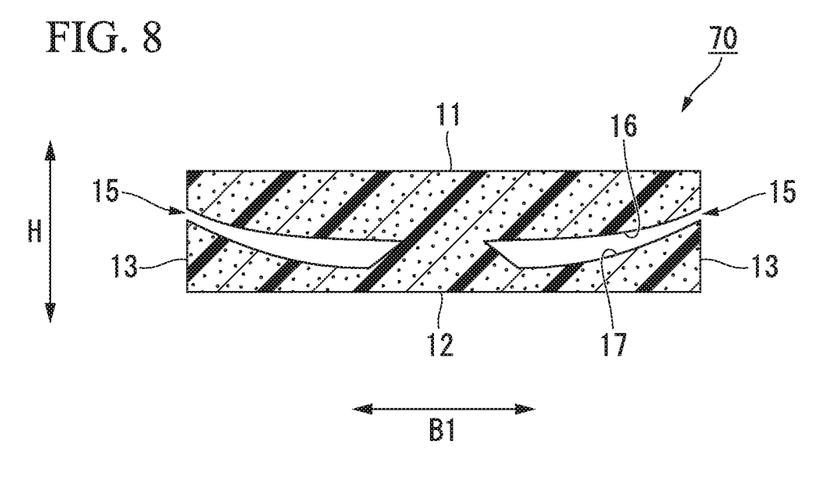
FIG. 8 is a sectional view of the seat pad shown in FIG. 6.

As shown in FIG. 8, each of the lateral slit portions 15 is curved to protrude in the thickness direction H. In the example shown, the lateral slit portion 15 is curved to protrude toward the side opposite to the seating surface along the thickness direction H. The inner end portion of the lateral slit portion 15 in the first lateral direction B1 is positioned to be closer to the side opposite to the seating surface along the thickness direction than the outer end portion of the lateral slit portion 15 in the first lateral direction B1. The lateral slit portions 15 are curved according to an outline of an occupant who sits on a seat.

Figure 7:
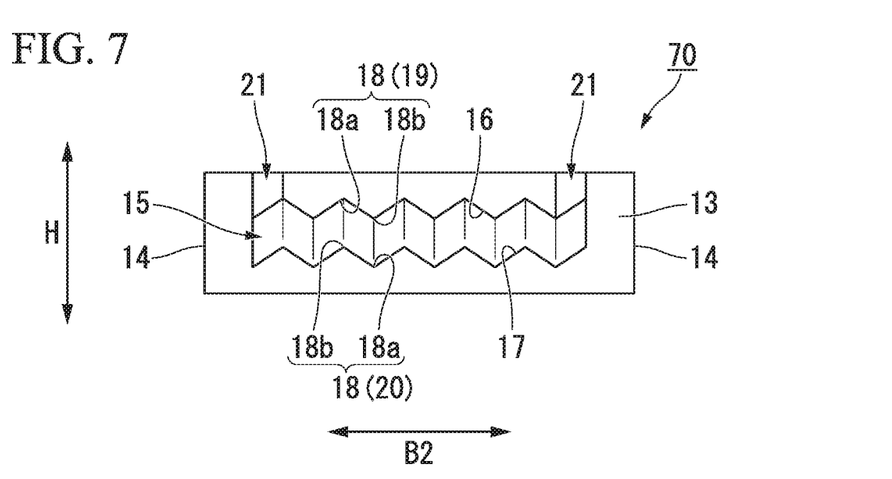
FIG. 7 is a side view of the seat pad shown in FIG. 6.

As shown in FIG. 7, in inner surfaces defining each of the lateral slit portions 15, an uneven portion 18 continuous in the second lateral direction B2 is formed on each of a first inner surface 16 positioned on the seating surface 11 side along the thickness direction and a second inner surface 17 positioned on the side opposite to the seating surface along the thickness direction H. Recessed portions 18a and protrusion portions 18b which configure the uneven portion 18 extend in the first lateral direction B1. Each of the recessed portions 18*a* and the protrusion portions 18*b* are formed in a triangular shape in a front view when viewed in the first lateral direction B1.

In a front view when viewed in the first lateral direction B1, in a first uneven portion 19 which is the uneven portion 18 firmed on the first inner surface 16 and a second uneven portion 20 which is the uneven portion 18 formed on the second inner surface 17, wave shapes formed by the surfaces of each of the first and second uneven portions 19 and 20 have the same shape as each other. In the wave shapes formed by the surfaces of the first uneven portion 19 and the second uneven portion 20, periods thereof along the second lateral direction B2 are the same as each other and amplitudes thereof along the thickness direction H are the same as each other. In the first uneven portion 19 and the second uneven portion 20, the recessed portions 18*a* and the protrusion portions 18*b* thereof face each other in the thickness direction H.

As shown in FIGS. 6 and 7, vertical slit portions 21 which extend from each of the lateral slit portions 15 toward the seating surface 11 side along the thickness direction H are provided on end portions of each of the lateral slit portions 15 in the second lateral direction B2. The vertical slit portions 21 are provided on both end portions of each of the lateral slit portions 15 in the second lateral direction B2. The vertical slit portions 21 are formed over the entire length of the lateral slit portion 15 in the first lateral direction B1. Each of the vertical slit portions 21 is formed in a linear shape which extends in the first lateral direction B1 in a plan view of the seat pad 70. The vertical slit portions 21 extend from the lateral slit portion 15 to the seating surface 11 and are open to the seating surface 11 over the entire length of the lateral slit portion 15 in the first lateral direction B1.

As described above, according to the seat pad 70 of the present embodiment, the lateral slit portions 15 are curved to protrude in the thickness direction H, and thus, the lateral slit portions 15 can easily follow the outline of the occupant who sits on the seating surface 11. Accordingly, the seat pad 70 can be bent along the outline of the occupant, a fit feeling increases, and thus, it is possible to improve a comfortable feeling.

In addition, like the present embodiment, in the case where the lateral slit portions 15 are curved to protrude toward the side opposite to the seating surface along the thickness direction H, the seat pad 70 can be effectively bent along the outline of the occupant, a fit feeling increases, and it is possible to improve a comfortable feeling.

In addition, the vertical slit portions 21 are provided on end portions of each of the lateral slit portions 15 in the second lateral direction B2. Accordingly, when the occupant sits on the seating surface 11, a portion (hereinafter, referred to as a "pressure receiving deformation portion") positioned between the seating surface 11 and each of the lateral slit portions 15 in the seat pad 70 is elongated to be deformed toward the outside in the second lateral direction B2 such that the vertical slit portion 21 is narrowed in the second lateral direction B2. Accordingly, the seat pad 70 can be deformed to enfold the occupant on the seating surface 11 from the outside in the second lateral direction B2, and thus, possible to further improve a comfortable feeling.

In addition, like the present embodiment, in the case where the lateral slit portions 15 and the vertical slit portions 21 are open to the surface of the seat pad 70, the pressure receiving deformation portions of the seat pad 70 can be easily deformed independently of other portions. Accordingly, when a core which forms each of the lateral slit portions 15 in a mold forming the seat pad 70 is removed from the seat pad 70, it is possible to positively deform the pressure receiving deformation portions to prevent an excessive load from being applied to the pressure receiving deformation portions, and thus, it is possible to easily and accurately form the seat pad 70.

In addition, in the first uneven portion 19 and the second uneven portion 20, the recessed portions 18*a* and the protrusion portions 18*b* of both portions face each other the thickness direction H. Accordingly, when an occupant sits on the seating surface 11 and the lateral slit portions 15 are narrowed in the thickness direction H, the first uneven portion 19 and the second uneven portion 20 can be fitted to each other.

Accordingly, in the seat pad 70, portions of positioned on both sides in a state where the lateral slit portion 15 is interposed therebetween in the thickness direction H can be prevented from being displaced to relative to each other in the second lateral direction B2 when an occupant sits on the seat pad, and thus, it is possible to further improve a comfortable feeling.

In addition, each of the lateral slit portions 15 is gradually lengthened in the first lateral direction B1 from the outer portion toward the inner portion along the second lateral direction B2. Accordingly, in the seating surface 11, compared to the portions positioned on both end portions of each lateral slit portion 15 in the second lateral direction B2, it is possible to positively deform a portion positioned at a center portion of each lateral slit portion 15 in the second lateral direction B2. Accordingly, the seat pad 70 can be deformed to enfold the occupant on the seating surface 11 from the outside in the second lateral direction B2 and thus, it is possible to further improve a comfortable feeling.

Fourth Embodiment

Figure 9:
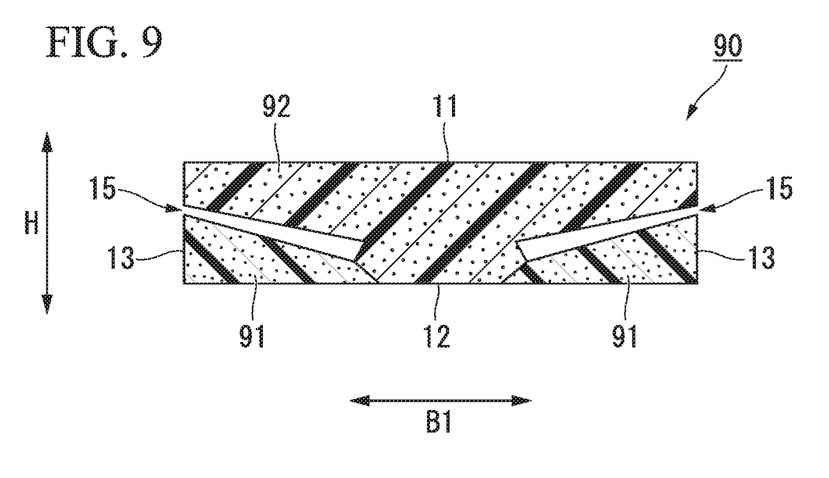
FIG. 9 is a sectional view of a seat pad according to a fourth embodiment of the present invention.

Next, a seat pad 90 of a fourth embodiment according to the present invention will be described with reference to FIG. 9.

Moreover, in the fourth embodiment, the same reference numerals are assigned to the components as those of the first embodiment, descriptions thereof are omitted, and matters different from each other will be mainly described.

The seat pad 90 according to the present embodiment is integrally formed of materials different from each other, and in the example shown, layers 91 and 92 having harnesses different from each other are laminated in the thickness direction H.

The seat pad 90 includes a base layer 91 on the attachment surface 12 side and a cushion layer 92 on the seating surface 11 side. The base layer 91 and the cushion layer 92 are partitioned by the lateral slit portions 15 in the thickness direction H, and in the seat pad 90, the portion positioned on the attachment surface 12 side from the lateral slit portions 15 becomes the base layer 91, and the portion positioned on the seating surface 11 side from the lateral slit portions 15 becomes the cushion layer 92.

In addition, in the present embodiment, the seating surface 11 is formed of the cushion layer 92, and thus, the hardness of the cushion layer 92 is lower than the hardness of the base layer 91.

Moreover, in the example shown, in the seat pad 90, the base layer 91 is disposed to be limited to both sides in the first lateral direction B1, and the center portion in the first lateral direction B1 is configured of the cushion layer 92. That is, in a sectional view when the seat pad 10 is viewed in the second lateral direction B2, the cushion layer 92 is formed in a T shape which protrudes toward the attachment surface 12 side. In the cushion layer 92, the portion protruding toward the attachment surface 12 side is connected to the base layers 91 from both sides in the first lateral direction B1.

As described above, according to the seat pad 90 according to the present embodiment, the base layers 91 and the cushion layer 92 are partitioned by the lateral slit portions 15 in the thickness direction H. Therefore, when an occupant sits on the seating surface 11 and the cushion layer 92 is deformed, it is possible to prevent the base layers 91 from being deformed to follow the cushion layer 92. Accordingly, it is possible to easily exert characteristics of the layers 91 and 92.

In addition, as described above, when an occupant sits on the seat pad, it is possible to prevent the base layers 91 from being deformed to follow the cushion layer 92, and in the present embodiment, the lateral slit portions 15 are provided on the portions positioned on both sides of the seat pad 10 in the first lateral direction B1. Accordingly, when an occupant sits on the seat pad, in the center portion of the seating surface 11, to which a load is easily applied, in the first lateral direction B1, it is possible to prevent a feeling of tightness (discomfort) from occurring. Accordingly, it is possible to more easily exert characteristics of the layers 91 and 92.

As described above, according to the seat pad 90 of the present embodiment, in the present embodiment, the hardness of the cushion layer 92 is lower than the hardness of the base layer 91 such that characteristics of the layers 91 and 92 can be more easily exerted. Accordingly, a feeling of hold with respect to an occupant can be secured by the base layers 91 while a fit feeling with respect to the occupant can be secured by the cushion layer 92, and thus, it is possible to effectively improve a comfortable feeling.

In addition, a technical scope of the present invention is not limited to the above-described embodiments, and various modifications can be applied to the present invention within a scope which does not depart from the gist of the present invention.

For example, in the above-described embodiments, the seat pads 10, 30, and 70 are integrally formed of the same material. However, the present invention is not limited to this. For example, the seat pads 10, 30, and 70 can be integrally formed of materials different from each other.

In the above-described embodiments, the lateral slit portions 15 are provided on the portions positioned on both sides of each of the seat pads 10, 30, 70, and 90 in the first lateral direction B1. However, the present invention is not limited to this. The lateral slit portion 15 may be provided is only one side in the first lateral direction B1.

In addition, the present invention can be appropriately modified to other aspects in which one or a plurality of lateral slit portions 15 are provided.

In the above-described embodiments, the lateral slit portions 15 are open to the first side surface 13. However, the lateral slit portions 15 may not be open to the first side surface 13.

In the above-described embodiments, the uneven portion 18 is continuous in the second lateral direction B2. However, the present invention is not limited to this. For example, the uneven portion 18 may be continuous in the first lateral direction B1. The present invention can be appropriately changed to other aspects in which the uneven portion 18 continuous in the regulation direction along the seating surface 11 is formed on each of the first inner surface 16 and the second inner surface 17 of each of the lateral slit portions 15.

The seat pads 10, 30, 70, and 90 can be used in various applications such as a cushion material for indoor chairs or bedding. In addition, the seal pads 10, 30, 70, and 90 can be applied to not only the seat pad having the placement surface on which a person sits down but also a seat pad having a placement surface on which a load or the like is placed.

Moreover, the components in the above-described embodiments can be appropriately replaced with well-known components within a scope which does not depart from the gist of the present invention, and the above-described modification examples may be appropriately combined.

INDUSTRIAL APPLICABILITY

According to the seat pad of the present invention, it is possible to improve a comfortable feeling.

REFERENCE SIGNS LIST

10, 30, 70, 90: seat pad
11: seating surface (placement surface)
15: lateral slit portion
16: first inner surface
17: second inner surface
18: uneven portion
18a: recessed portion
18b: protrusion portion
19: first uneven portion
20: second uneven portion
21: vertical slit portion
B1: first lateral direction
B2: second lateral direction
H: thickness direction

The invention claimed is:

1. A seat pad which includes a placement surface and side surfaces, the side surfaces extending in a direction orthogonal to a first lateral direction, the placement surface extending along the first lateral direction, and the first lateral direction being a left-right direction of an automobile;
   wherein a lateral slit portion, which opens at the side surfaces and extends from the side surfaces toward a center of the seat pad in the first lateral direction, is formed;
   wherein at least a portion of the lateral slit portion gradually becomes larger in a thickness direction, which is orthogonal to the placement surface, toward the center of the seat pad in the first lateral direction from the side surfaces; and
   wherein a vertical slit portion, which extends from the lateral slit portion toward the placement surface side along the thickness direction, is provided on an end portion of the lateral slit portion in a second lateral direction, which is orthogonal to the first lateral direction along the placement surface.

2. The seat pad according to claim 1,
   wherein the lateral slit portion gradually becomes larger in the thickness direction toward the center of the seat pad in the first lateral direction over the entire length of the lateral slit portion in the first lateral direction.

3. The seat pad according to claim 2,
   wherein the lateral slit portion is curved so as to protrude in the thickness direction.

4. The seat pad according to claim 3,
   wherein an uneven portion continuous in a regulation direction along the placement surface is formed on each of a first inner surface positioned on a placement surface side of inner surfaces defining the lateral slit portion along the thickness direction and a second inner surface positioned on a side opposite to the placement surface side of inner surfaces defining the lateral slit portion along the thickness direction, and wherein a recessed portion and a protrusion portion in a first uneven portion, which is the uneven portion formed on the first inner surface, face a protrusion portion and a recessed portion respectively in the thickness direction in a second uneven portion, which is the uneven portion formed on the second inner surface.

5. The seat pad according to claim 3, wherein the lateral slit portion is gradually lengthened in the first lateral direction toward a center of the seat pad in the second lateral direction over the entire length of the lateral slit portion in the second lateral direction.

6. The seat pad according to claim 2, wherein an uneven portion continuous in a regulation direction along the placement surface is formed on each of a first inner surface positioned on a placement surface side of inner surfaces defining the lateral slit portion along the thickness direction and a second inner surface positioned on a side opposite to the placement surface side of inner surfaces defining the lateral slit portion along the thickness direction, and wherein a recessed portion and a protrusion portion in a first uneven portion, which is the uneven portion formed on the first inner surface, face a protrusion portion and a recessed portion respectively in the thickness direction in a second uneven portion, which is the uneven portion formed on the second inner surface.

7. The seat pad according to claim 2, wherein the lateral slit portion is gradually lengthened in the first lateral direction toward a center of the seat pad in the second lateral direction over the entire length of the lateral slit portion in the second lateral direction.

8. The seat pad according to claim 1, wherein the lateral slit portion is curved so as to protrude in the thickness direction.

9. The seat pad according to claim 8, wherein an uneven portion continuous in a regulation direction along the placement surface is formed on each of a first inner surface positioned on a placement surface side of inner surfaces defining the lateral slit portion along the thickness direction and a second inner surface positioned on a side opposite to the placement surface side of inner surfaces defining the lateral slit portion along the thickness direction, and wherein a recessed portion and a protrusion portion in a first uneven portion, which is the uneven portion formed on the first inner surface, face a protrusion portion and a recessed portion respectively in the thickness direction in a second uneven portion, which is the uneven portion formed on the second inner surface.

10. The seat pad according to claim 8, wherein the lateral slit portion is gradually lengthened in the first lateral direction toward a center of the seat pad in the second lateral direction over the entire length of the lateral slit portion in the second lateral direction.

11. The seat pad according to claim 1, wherein an uneven portion continuous in a regulation direction along the placement surface is formed on each of a first inner surface positioned on a placement surface side of inner surfaces defining the lateral slit portion along the thickness direction and a second inner surface positioned on a side opposite to the placement surface side of inner surfaces defining the lateral slit portion along the thickness direction, and wherein a recessed portion and a protrusion portion in a first uneven portion, which is the uneven portion formed on the first inner surface, face a protrusion portion and a recessed portion respectively in the thickness direction in a second uneven portion, which is the uneven portion formed on the second inner surface.

12. The seat pad according to claim 11, wherein the lateral slit portion is gradually lengthened in the first lateral direction toward a center of the seat pad in the second lateral direction over the entire length of the lateral slit portion in the second lateral direction.

* * * * *